(12) United States Patent
Oh (10) Patent No.: US 7,243,247 B2
(45) Date of Patent: Jul. 10, 2007

(54) METHOD FOR RECHECKING WHETHER A CPU ENTERS A POWR SAVING STAT AFTER A DELAY AD FORCING THE CPU TO ENTER POWER SAVING STATE DEPENDING ON THE RESULT

(75) Inventor: Jang Geun Oh, Suwon-si (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 10/808,488

(22) Filed: Mar. 25, 2004

(65) Prior Publication Data

US 2005/0010828 A1    Jan. 13, 2005

(30) Foreign Application Priority Data

Jul. 9, 2003    (KR) ...................... 10-2003-0036695

(51) Int. Cl.
*G06F 1/00* (2006.01)
(52) U.S. Cl. ...................................... 713/300
(58) Field of Classification Search ................ 713/300, 713/320, 323; 709/253
See application file for complete search history.

(56) References Cited

U.S. PATENT DOCUMENTS 5,784,628 A    7/1998 Reneris ................. 395/750.01
6,148,345 A *  11/2000 Yamaki ....................... 709/253
6,308,278 B1 * 10/2001 Khouli et al. ............... 713/323
6,499,102 B1   12/2002 Ewertz .......................... 713/1
6,968,468 B2 * 11/2005 Lam ........................... 713/320

FOREIGN PATENT DOCUMENTS

| KR | 10-2002-38385 | 5/2002 |
| WO | WO 98/44405 | 10/1998 |

OTHER PUBLICATIONS

Chinese Office Action (dated May 27, 2005).

* cited by examiner

*Primary Examiner*—Thomas Lee
*Assistant Examiner*—Sean Weinman
(74) *Attorney, Agent, or Firm*—Ked & Associates, LLP (57) ABSTRACT

Embodiments of a device and method for managing power in a computer system can reduce power consumption. A circuit such as a filter driver having a packet monitoring function can be used to perform a check on whether a specific device such as an audio or USB device is in use and a check on the power management state of a CPU. Depending on the checked results, the filter driver forces the CPU power management state to enter a specific power saving state. Accordingly, unnecessary power consumption caused by the CPU in an idle state can be reduced or prevented. Further, heat generated by the CPU can be reduced or suppressed.

30 Claims, 5 Drawing Sheets

FIG. 1
(Prior Art)

ACPI (Advanced Configuration and Power Interface)

| State | Description |
|---|---|
| C0 | Working |
| C1 | Halt |
| C2 | Stop Grant(Sleep) |
| C3 | CPU Stop(Deep Sleep) |
| C4 | Deeper Sleep |

METHOD FOR RECHECKING WHETHER A CPU ENTERS A POWR SAVING STAT AFTER A DELAY AD FORCING THE CPU TO ENTER POWER SAVING STATE DEPENDING ON THE RESULT

BACKGROUND OF THE INVENTION

1. Field of the Invention

The present invention relates to a device and method for managing power in a computer system.

2. Background of the Related Art

Figure 1:
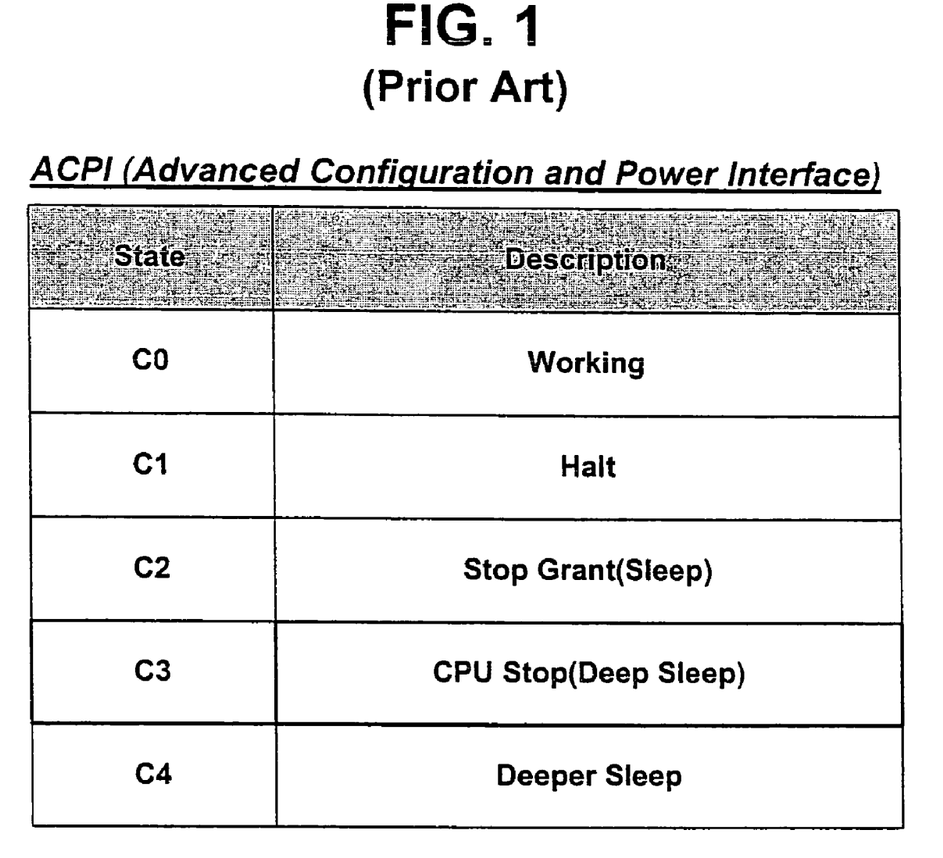
FIG. 1 is a table showing power management states of a CPU defined in a prior art ACPI (Advanced Configuration and Power Interface)

In a general computer system such as a notebook computer or a desktop computer, according to a system operating state, an operating system adjusts the power management state of a CPU to one of the states C0 to C4 defined in the ACPI (Advanced Configuration and Power Interface) standard, as shown in FIG. 1. The C0 state is a CPU working state, the C1 state is a CPU halt state and the C2 state is a CPU sleep state with a clock input being granted. The C3 state is a CPU stop state with an external clock input being stopped, and the C4 state is a C3 state with a low drive voltage being applied. In general, if the CPU enters an idle state, the power management state becomes the C3 or C4 state defined in the ACPI standard to prevent unnecessary power consumption.

When the operating system executes only a program for an audio device through an interface with an audio controller or only a program for a USB device through an interface with a USB controller, the CPU of the computer system is operated at only about 10% of the maximum performance mode. Although when the operating system executes only the audio device program or the USB device program and the CPU of the computer system operates at only about 10% of the maximum performance mode, the CPU maintains the C2 state (i.e., a CPU sleep state with a clock input being granted) unchanged or C1 state, causing unnecessary power consumption.

As described above, the related art computer system has various disadvantages. For example, in a notebook computer, unnecessary maintenance of the C2 state leads to unnecessary power consumption of about 1.5 W since the power consumption difference between the states C2 and C3 is 1.5 W, which also causes an increase in the system temperature due to the CPU's heat.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a device and method for managing power in a computer system that can determine both a power management state of a CPU and whether a specific device is in use to selectively force a reduced power management state.

Another object of the present invention is to provide a device and method for managing power in a computer system that can check both a power management state of a CPU and whether a specific device such as an audio or USB (Universal Serial Bus) device is in use in a computer system to adjust the computer system to a power saving state responsive to the checked results.

Another object of the present invention is to provide a device and method for managing power in a computer system including a filter driver that can determine a power management state of a CPU and whether a specific device is in use to selectively force a reduced power management state.

Another object of the present invention is to provide a device and method for managing power in a computer system including a filter driver having a packet monitoring function that detects whether a specific device such as an audio device or a USB device is in use, and if the detected result is that the specific device is in use, checks whether the power management state of a CPU at a C1 or C2, and then the power management state of the CPU is directly set to a C3 or C4 state according to the checked result, independent of the operating system.

In order to achieve at least the above objects and advantages in a whole or in part, in accordance with one aspect of the present invention there is provided a method for managing power in a computer system that includes checking whether a prescribed device is in use, identifying a power management state of a CPU and forcing the power management state of the CPU to enter a prescribed power saving state when the prescribed device is in use according to the identified power management state.

To further achieve at least the above objects in a whole or in part, in accordance with one aspect of the present invention there is provided an article including a machine-readable storage medium containing instructions for managing power in a computer system including therein a filter driver having a monitoring function, said instructions, when executed in the computer system, causing the filter driver to check whether a specific device is in use, check a power management state of a CPU and force the power management state of the CPU to enter a specific power saving state, when the specific device is in use according to a result of the check on the power management state of the CPU.

To further achieve at least the above objects in a whole or in part, in accordance with one aspect of the present invention there is provided a computer system that includes a CPU, an operating system configured to set a power management state of the CPU in the computer system while dividing the power management state into a multi-step operating state and power saving state, at least one prescribed device and a filter driver configured to transition the power management state of the CPU to a prescribed power saving state according to a current power management state and a status of the prescribed device.

To further achieve at least the above objects in a whole or in part, in accordance with one aspect of the present invention there is provided a device for managing power in a computer system that includes a CPU, and one of an audio device and a USB device, wherein the CPU has a multi-step operating and power saving state, said device including an operating system configured to set a power management state of the CPU and a filter driver configured to force the power management state of the CPU to be set from a C1 or C2 state defined in the ACPI standard to a C3 or C4 state defined in an ACPI standard when said one of an audio device and a USB device is in use.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
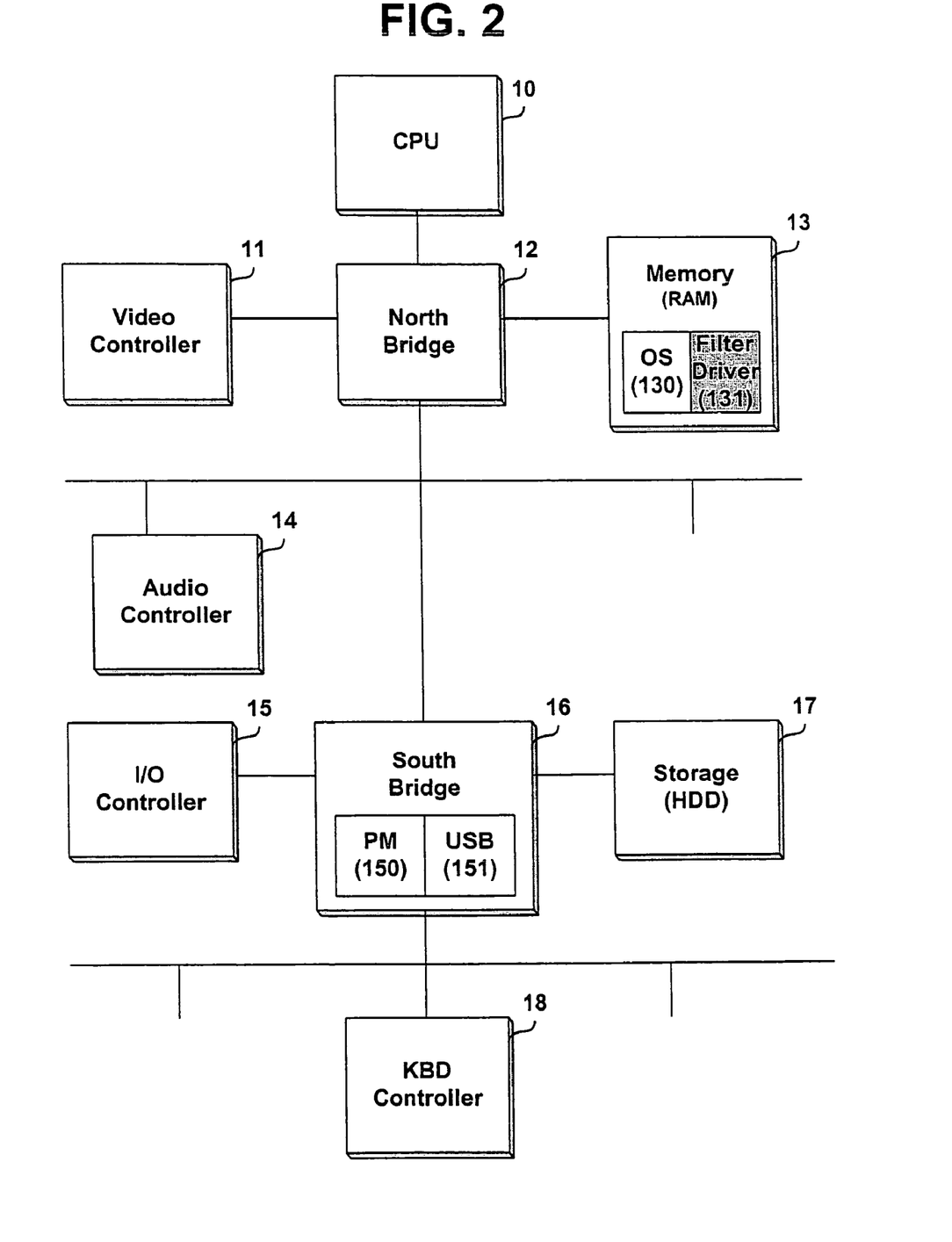
FIG. 2 is a block diagram showing the configuration of a computer system to which a power management device and method according to the present invention is applied.

FIG. 2 is a block diagram showing the configuration of a computer system including an embodiment of power management device according to the present invention. As shown in FIG. 2, the computer system can include a CPU 10, a video controller 11, a north bridge 12, a RAM 13, an audio controller 14, an I/O controller 15, a south bridge 16, a hard disk 17, a keyboard controller 18, etc. An operating system program and a filter driver program having a packet monitoring function can be stored in the hard disk 17. The south bridge 16 can include a power manager (PM) 150 and a USB controller 151.

As the system boots up, an operating system (OS) stored in the hard disk 17 can be uploaded to the RAM 13 and executed. According to the system operating state, the operating system 130 uploaded to the RAM 13 can adjust the power management state of the CPU 10 to one of the states C0 to C4 defined in the ACPI (Advanced Configuration and Power Interface) standard, as shown in FIG. 1. A filter driver program 131, together with the operating system program 130, can be uploaded to the RAM 13 and executed as the system boots up.

Figure 3:
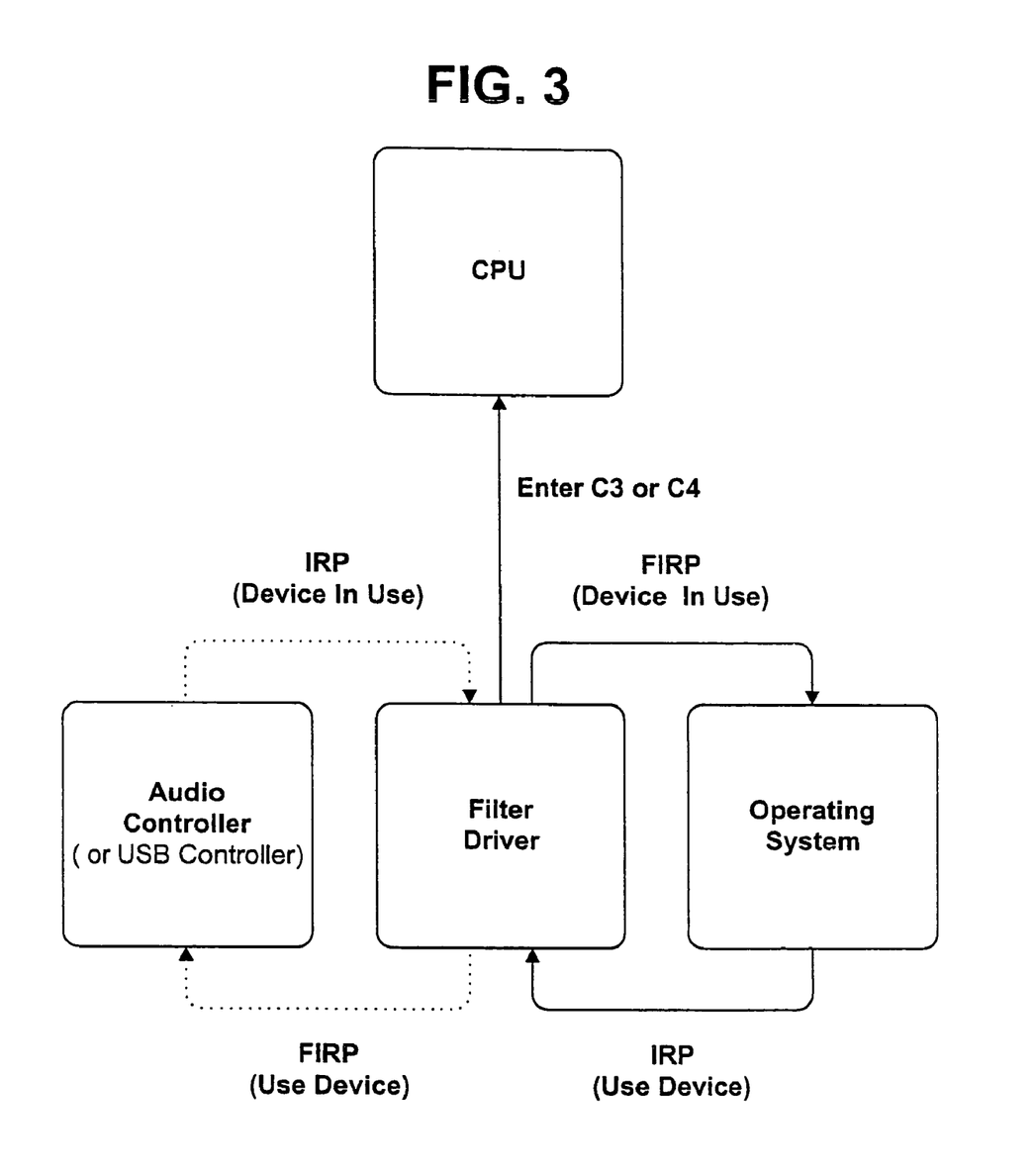
FIG. 3 is a conceptual view showing the cooperation state between a CPU, an audio device, and an operating system interfacing with a filter driver according to the present invention.
Figure 4:
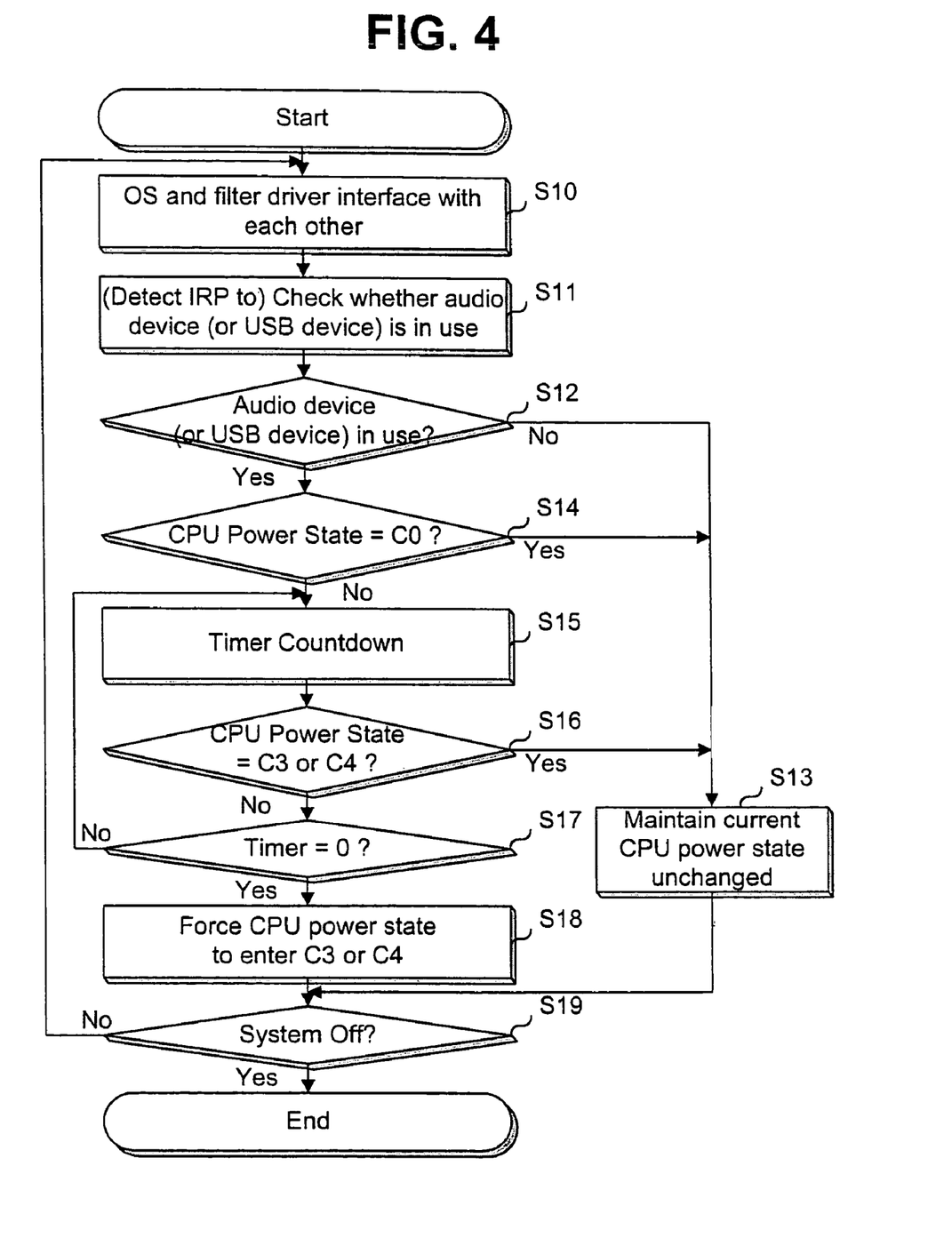
FIG. 4 is a flowchart showing a method for managing power in a computer system according to preferred embodiment of the present invention.

FIG. 3 is a diagram showing an exemplary cooperation state between the CPU, the audio device, and the operating system interfacing with the filter driver according to embodiments of the present invention. FIG. 4 is a flowchart showing an embodiment of a method for managing power in a computer system according to the present invention. The embodiment of a method for managing power in a computer system of FIG. 4 can be applied to and will be described using the computer system shown in FIG. 2. However, the present invention is not intended to be so limited.

The filter driver 131 and the operating system 130 uploaded to the RAM 13 can perform a mutual interface operation as shown in FIGS. 3 and 4 (block S10). The operating system 130 preferably transfers a message such as an IRP (In/Out Request Packet), containing a command for controlling the use of the audio device or the USB device, to the filter driver 131.

The filter driver 131 can transfer a message such as an FIRP (Filter IRP) for controlling the use of the audio or USB device to the audio controller 14 or the USB controller 151. In addition, the filter driver 131 monitors (e.g., continuously) the IRP outputted from the audio controller 14 or the USB controller 151 to detect and check whether or not the audio or USB device is in use (block S11).

If the detected result at block S11 is that the audio or USB device is not in use (block S12), the filter driver 131 can allow the current power management state of the CPU to remain unchanged (block S13). If it is determined that the detected result is that the audio or USB device is in use (block S12), the filter driver 131 can produce a corresponding FIRP and transfer it to the operating system 130, and can also check the power management state of the CPU.

If the audio or USB device is in use while the checked power management state of the CPU is currently set to a state (e.g., C0) that corresponds to a CPU working state (block S14), the filter driver 131 preferably allows the CPU power management state to remain unchanged (block S13).

If the audio or USB device is in use while the checked power management state of the CPU is currently set to a power management state (e.g., C1 or C2 state), the filter driver 131 preferably sets or allows the CPU power management state to be forcibly set to a power savings state (e.g., C3 or C4 state), independently of the operating system 130. However, if the checked power management state of the CPU is currently set to the C3 or C4 state, the filter drive 131 preferably maintains the CPU power management state unchanged.

Accordingly, while performing a countdown such as from a predetermined time or a predetermined count (block S15) or the like, the filter driver 131 can check whether the power management state of the CPU enters the C3 or C4 state that corresponds to a power saving mode (block S16). If the power management state of the CPU has entered the C3 or C4 state in the predetermined time (block S16), the filter driver 131 maintains the current CPU power management state unchanged (block S13). On the contrary, if it is determined that the CPU power management state has not entered the C3 or C4 state even after the predetermined time or count has lapsed (block S17) (e.g., after the countdown time has reached zero) the filter driver 131 can transfer a message such as a FIRP for forcing the CPU power management state to enter the C3 or C4 state (e.g., a power saving mode) to the CPU 10 to forcibly set the CPU power management state to the C3 or C4 state (block S18).

The filter driver 131 preferably continuously or periodically performs the operation for monitoring the IRP outputted from the audio device or the USB device until the system is turned off (block S19). Accordingly, it is possible to effectively reduce or prevent unnecessary power consumption in the idle state of the CPU in which the utilization of the CPU is only about 10% of the maximum performance mode. In a general computer system, when the operating system executes only the audio device program or the USB device program, the CPU is operated at only about 10% of a maximum performance mode.

Figure 5:
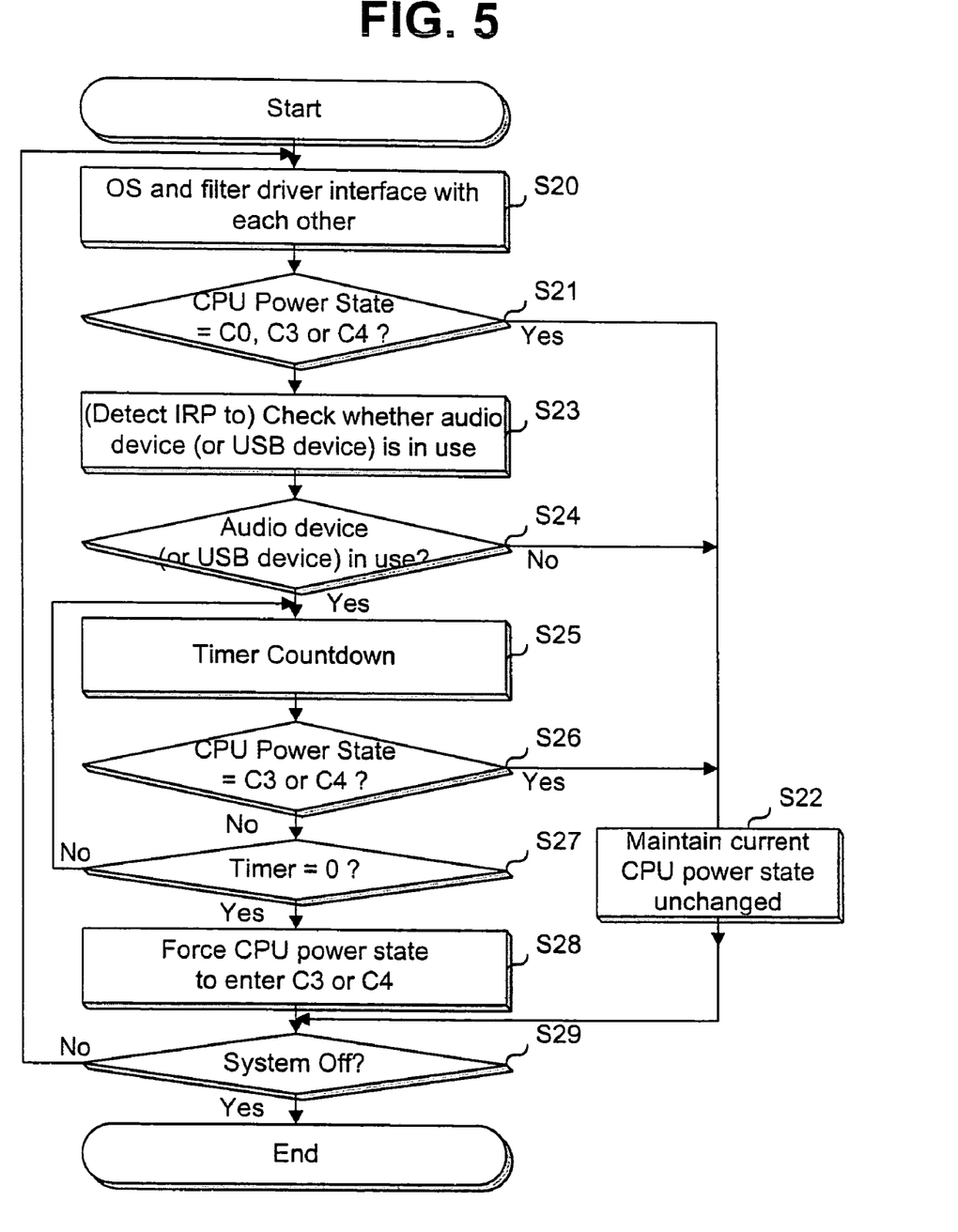
FIG. 5 is a flowchart showing a method for managing power in a computer system according to another preferred embodiment of the present invention.

FIG. 5 is a flowchart showing a method for managing power in a computer system according to another embodiment of the present invention. The embodiment of a method for managing power in a computer system of FIG. 5 can be applied to and will be described using the computer system show in FIG. 2. However, the present invention is not intended to be so limited.

As shown in FIG. 5, the filter driver 131 and the operating system 130 uploaded to the RAM 13 perform a mutual interface operation as described above with reference to FIGS. 3 and 4 (block S20). The filter driver 131 can check the power management state of the CPU 10 to determine whether the power management state is currently set to the C0, C3 or C4 state, in which the C0 state corresponds to the CPU working state and the C3 or C4 state corresponds to the power saving mode (block S20). If the determined result at block S21 is that the power management state is currently set to the C0, C3 or C4 state, the filter driver preferably allows the power management state of the CPU to remain unchanged (block S22).

If the determined result at block S21 is that the power management state of the CPU is currently set to the C1 or C2 state, the filter driver 131 can monitor (e.g., continuously, periodically or repeatedly) an IRP outputted from the audio controller 14 or the USB controller 151 to check whether or not the audio or USB device is in use (block S23). If it is detected that the audio or USB device is not in use (block S24), the filter driver 131 can allow the current CPU power management state to remain unchanged (block S22).

If it is detected or determined that the audio or USB device is in use (block S24), the filter driver 131 can produce a corresponding message such as a FIRP (Filter In/Out Request Packet), and transfer it to the operating system 130. In addition, while performing a countdown from a predetermined time (block S25), the filter driver 131 can check whether the power management state of the CPU enters the C3 or C4 state that corresponds to a power saving mode (block S26). If it is determined at block S26 that the power management state of the CPU 10 has entered the power saving state (e.g., C3 or C4 state) in the predetermined time, the filter driver 131 can allow the current CPU power management state to remain unchanged (block S22). If it is determined that the CPU power management state has not entered the C3 or C4 state even after the predetermined time has lapsed, e.g., after the countdown time has reached zero (block S27), the filter driver 131 can transfer a message or packet such as an FIRP for forcing the CPU power management state to enter the C3 or C4 state (e.g., the power saving mode) to the CPU 10 to forcibly set the CPU power management state to the C3 or C4 state (block S28). Thus, the filter driver can set the CPU power management state independent of the operating system 130.

As described in preferred embodiments of an apparatus and method according to the present invention, upon determining a prescribed device (e.g., audio device or USB device) is in use and a CPU is in a first power reduction mode (e.g., ACPI modes C1 or C2), the CPU is preferably transitioned to a second (greater power savings) power reduction mode (e.g., ACPI modes C3 or C4). Preferably, a delay interval passes before the transition is forced to the second power reduction modes (e.g., blocks S15–S17 of FIG. 4). Such a delay could be monitored using a delay timer, a countdown circuit or the like. Further, monitoring could be only once, a few times or each time during a time interval or a countdown value to zero. However, the present invention is not intended to be so limited as other methods of determining and monitoring during a delay interval can be used. In addition, such a delay interval can be considered optional.

The filter driver 131 preferably performs the operation for monitoring the IRP outputted from the audio device or the USB device until the system is turned off (block S29). Accordingly, it is possible to effectively reduce or prevent unnecessary power consumption in the idle state of the CPU in which the utilization of the CPU is only about 10% of the maximum performance mode.

Various software or firmware layers based upon a module or routine format containing application programs, operating system modules, device drivers, BIOS modules and interrupt handlers can be stored in at least one storage medium provided in the computer system. The applicable storage media include hard disc drives, compact discs (CDs) or digital versatile discs DVDs), floppy discs, nonvolatile memories and system memories. The modules, routines or other layers stored in the storage medium contain instructions for allowing the convertible computer system to execute programmed acts when executed.

The software or firmware layers can be loaded on the system by one of various methods. For example, code segments are stored in floppy discs, CD or DVD discs or hard discs, or code segments transported through a network interface card, modem or other interface devices can be loaded on the system and can be executed by a corresponding software or firmware layer. In the loading or transporting process, the code segments and data signals carried by a carrier (through a telephone line, a network line, a radio link, a cable, etc.) can be sent to the system.

As described above, embodiments of a device and method configured to manage power in a computer system according to the present invention have various advantages. For example, embodiments of a device and method for managing power in a computer system can reduce or avoid unnecessary power consumption caused by a CPU in an idle state, and also effectively reduce or suppress heat generated by the CPU.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for managing power in a computer system, comprising:
    checking whether a prescribed device is in use;
    identifying a power management state of a CPU; and
    forcing the power management state of the CPU to enter a prescribed power saving state when the prescribed device is in use according to the identified power management state,
    wherein the forcing the power management state of the CPU to enter the prescribed power saving state comprises:
    establishing a prescribed delay interval of time;
    re-checking whether the power management state has entered the prescribed power saving state after the prescribed delay interval has passed; and
    forcing the power management state of the CPU to enter the prescribed power saving state when the re-checked power management state is not the prescribed power saving state.

2. The method of claim 1, wherein the prescribed device is an audio device or a USB device.

3. The method of claim 2, wherein a filter driver has a packet monitoring function for said checking whether the prescribed device is in use.

4. The method of claim 3, wherein the filter driver detects an IRP (In/Out Request Packet) outputted from the prescribed device to check whether the prescribed device is in use.

5. The method of claim 4, wherein said forcing the power management state of the CPU to enter the prescribed power saving state includes the filter driver forcing the power management state of the CPU to enter a C3 or C4 state as the prescribed power saving state when the power management state of the CPU is a C1 or C2 state, wherein the power states are determined in an ACPI (Advanced Configuration and Power Interface) standard, and wherein the filter driver directly transitions the power management state of the CPU independently of an operating system.

6. The method of claim 1, wherein the power management state remains unchanged when the prescribed device is not in use.

7. The method of claim 1, wherein the prescribed power saving state is a C3 or C4 state defined in an ACPI (Advanced Configuration and Power Interface) standard.

8. The method of claim 7, wherein said forcing the power management state of the CPU to enter the prescribed power saving state includes forcing the power management state of the CPU to enter the C3 or C4 state as the prescribed power saving state if the power management state of the CPU is a C1 or C2 state defined in the ACPI standard.

9. The method of claim 7, wherein said forcing the power management state of the CPU to enter the prescribed power saving state includes maintaining the power management state of the CPU unchanged if the ACPI standard power management state of the CPU is a C0 state or the C3 or C4 state.

10. The method of claim 1, wherein said forcing the power management state of the CPU to enter the prescribed power saving state comprises:
  initializing a countdown value;
  re-checking whether the power management state has entered the prescribed power saving state; and
  reducing the countdown value by one and repeating said re-checking unless the power management state is the prescribed power saving state until the countdown value is zero; and
  forcing the power management state of the CPU to enter the prescribed power saving state when countdown value is zero and the re-checked power management state is not the prescribed power saving state.

11. An article including a machine-readable storage medium containing instructions for managing power in a computer system including therein a filter driver having a monitoring function, said instructions, when executed in the computer system, causing the filter driver to:
  check whether a specific device is in use;
  check a power management state of a CPU; and
  force the power management state of the CPU to enter a specific power saving state, when the specific device is in use according to a result of the check on the power management state of the CPU,
  wherein the instructions causing the filter driver to force the power management state of the CPU to enter the specific power saving state comprise instructions to:
    establish a prescribed delay interval of time;
    re-check whether the power management state has entered the specific power saving state after the prescribed delay interval has passed; and
    force the power management state of the Cpu to enter the specific power saving state when the re-checked power management state is not the specific power saving state.

12. The article of claim 11, wherein the specific device is an audio device or a USB device.

13. The article of claim 11, wherein the storage medium contains instructions for causing the filter driver to detect an IRP outputted from the specific device to check whether the specific device is in use.

14. The article of claim 11, wherein the storage medium contains instructions for causing the filter driver to maintain the power management state of the CPU unchanged when the specific device is not in use.

15. The article of claim 11, wherein the specific power saving state is a C3 or C4 state defined in an ACPI (Advanced Configuration and Power Interface) standard.

16. The article of claim 15, wherein the storage medium contains instructions for causing the filter driver to force the power management state of the CPU to enter the C3 or C4 state as the specific power saving state when the power management state of the CPU is a C1 or C2 state defined in the ACPI standard.

17. The article of claim 15, wherein the storage medium contains instructions for causing the filter driver to maintain the power management state of the CPU unchanged if the power management state of the CPU is a C0 state or the C3 or C4 state.

18. The article of claim 11, wherein said instructions causing the filter driver to force the power management state of the CPU to enter the specific power saving state comprise instructions to:
  initialize a countdown value;
  re-check whether the power management state has entered the specific power saving state; and
  reduce the countdown value by one and repeat said re-check until the countdown value is zero unless the power management state is the specific power saving state; and
  force the power management state of the CPU to enter the specific power saving state when countdown value is zero and the re-checked power management state is not the specific power saving state.

19. A computer system, comprising:
  a CPU;
  an operating system configured to set a power management state of the CPU in the computer system while dividing the power management state into a multi-step operating state and power saving state;
  at least one prescribed device;
  a filter driver configured to transition the power management state of the CPU to a prescribed power saving state according to a current power management state and a status of the prescribed device; and
  a timer that is configured to establish a prescribed delay interval of time.
  wherein the filter driver re-checks whether the power management state has entered the prescribed power saving state after the prescribed delay interval has passed. the friter driver forcing the transition of the power management state of the CPU to the prescribed power saving state when the re-checked power management state is not the prescribed power saving state.

20. The computer system of claim 19, wherein the prescribed device is an audio device or a USB device.

21. The computer system of claim 19, wherein the filter driver detects an IRP of the prescribed device to check whether the status of the prescribed device is in use.

22. The computer system of claim 19, wherein the filter driver maintains the current power management state of the CPU unchanged when the status of the prescribed device is not in use, and wherein the filter driver maintains the current power management state when the CPU is in a C0 state a C3 or C4 state defined in an ACPI standard.

23. The computer system of claim 19, wherein the prescribed power saving state is a C3 or C4 state defined in an ACPI (Advanced Configuration and Power Interface) standard.

24. The computer system of claim 23, wherein the filter driver forces the current power management state of the CPU to be set to the prescribed power saving state when the status of the prescribed device is checked to be in use and the CPU is in a C1 or C2 state defined in the ACPI standard.

25. The computer system of claim 24, wherein the filter driver directly transitions the current power management state of the CPU independent of the operating system.

26. The computer system of claim 19, comprising a countdown circuit configured to countdown from a countdown value to zero, wherein the power management state is repeatedly re-checked for each value of the countdown circuit from the countdown value to zero unless the power management state is the prescribed power saving state, and wherein the filter driver forces the transition of the power management state of the CPU to the prescribed power saving state when countdown value is zero and the re-checked power management state is not the prescribed power saving state.

27. A device for managing power in a computer system that includes a CPU, and one of an audio device and a USB device, wherein the CPU has a multi-step operating and power saving state, said device comprising;

an operating system configured to set a power management state of the CPU;

a filter driver configured to force the power management state of the CPU to be set from a C1 or C2 state defined in the ACPI standard to a C3 or C4 state defined in an ACPI standard when said one of the audio device and the USB device is in use.

a timer that is configured to establish a prescribed delay interval of time, wherein the filter driver re-checks whether the power management state has entered the prescribed power saving state after the prescribed delay interval has passed, and wherein the filter driver forces the transition of the power management state of the CPU to the prescribed power saving state when the re-checked power management state is not the prescribed power saving state.

28. The device of claim 27, wherein the filter driver directly forces the power management state of the CPU to be changed, independently of the operating system.

29. The device of claim 28, wherein the filter driver detects an IRP of said one of the audio device and the USB device to check whether said one of the audio device and the USB device is in use.

30. The device of claim 28, wherein the filter driver maintains the power management state of the CPU unchanged when said one of the audio device and the USB device is not in use, and wherein the filter driver maintains the power management state of the CPU unchanged, if the CPU is in a C0 state or the C3 or C4 state.

* * * * *

UNITED STATES PATENT AND TRADEMARK OFFICE
CERTIFICATE OF CORRECTION

PATENT NO.       : 7,243,247 B2                                                 Page 1 of 1
APPLICATION NO. : 10/808488
DATED            : July 10, 2007
INVENTOR(S)      : Jang Geun Oh

It is certified that error appears in the above-identified patent and that said Letters Patent is hereby corrected as shown below:

TITLE PAGE, ITEM (54) TITLE: SHOULD READ AS FOLLOWS (54)   METHOD FOR RECHECKING WHETHER A CPU ENTERS A POWER SAVING STATE AFTER A DELAY AND FORCING THE CPU TO ENTER POWER SAVING STATE DEPENDING ON THE RESULT

Signed and Sealed this

Twenty-third Day of October, 2007

JON W. DUDAS
*Director of the United States Patent and Trademark Office*